United States Patent
Fukumoto et al.

(10) Patent No.: US 6,462,891 B1
(45) Date of Patent: Oct. 8, 2002

(54) SHAPING OPTIC FOR DIODE LIGHT SHEETS

(75) Inventors: Joseph M. Fukumoto, Rancho Palos Verdes; Cheng-Chih Tsai, Cerritos, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/553,515

(22) Filed: Apr. 20, 2000

(51) Int. Cl.[7] ................................................. G02B 3/08
(52) U.S. Cl. ...................... 359/742; 359/743
(58) Field of Search ................. 359/742, 741, 359/743, 719, 796, 708, 710, 718, 558, 566, 569, 571

(56) References Cited

U.S. PATENT DOCUMENTS

| | | | |
|---|---|---|---|
| 4,799,778 A | * 1/1989 | Jebens | 359/742 |
| 5,114,513 A | 5/1992 | Hosokawa et al. | 156/150 |
| 5,160,192 A | 11/1992 | Sugawara | 362/16 |
| 5,410,563 A | 4/1995 | Nakamura et al. | 372/101 |
| 5,986,807 A | * 11/1999 | Fork | 359/569 |
| 5,993,898 A | * 11/1999 | Nagatsuka | 427/162 |
| 5,995,303 A | * 11/1999 | Honguh et al. | 359/708 |
| 6,005,717 A | 12/1999 | Neuberger et al. | 359/619 |
| 6,281,993 B1 | * 8/2001 | Bernal et al. | 359/29 |

FOREIGN PATENT DOCUMENTS

| | | |
|---|---|---|
| EP | 0 307 487 | 3/1989 |
| JP | 57-144502 | * 9/1982 |
| WO | WO 99 50596 | 10/1999 |

* cited by examiner

Primary Examiner—Jordan M. Schwartz
(74) Attorney, Agent, or Firm—Colin M. Raufer; Leonard A. Alkov; Glenn H. Lenzen, Jr.

(57) ABSTRACT

A shaping optic for diode light sheets. The Fresnel cylinder lens has a plurality of facets that channel multiple light sheet output from a diode stack having arbitrary pitch and diode bar number into a gaussian pump light deposition profile within a laser gain medium. In a specific embodiment, the lens is formed of fused silica or BK7 glass covered with broad angle anti-reflection coating, and the vertical extent of the facets is matched to the pitch spacing of the diode.

5 Claims, 4 Drawing Sheets

SHAPING OPTIC FOR DIODE LIGHT SHEETS

This invention was made with Government support under Contract No. DAAB07-98-C-0267 awarded by the Department of the Air Force. The Government has certain rights in this invention.

BACKGROUND OF THE INVENTION

1. Field of Invention

This invention relates to optics. Specifically, the present invention relates to shaping optics for diode light sheets.

2. Description of the Related Art

Lasers are used in high pulse energy applications such as weapons, radar and ranging. To be most efficient, the pump density needs to be high, and the distribution should be tailorable as well as energetic. However, current laser diodes are manufactured with a minimum internal spacing dictated by cooling requirements for each diode. With directly coupled systems where the diode array is placed as close to laser medium as possible, this spacing dictates pump density, and is not necessarily ideal for laser gain media such as Nd:YAG or Nd:YLF.

Diodes alone produce a limited fixed distribution profile. Conventional lenses, typically standard spherical optics, may be added to produce limited shaping of the profile. A traditional diode-to-slab coupling optic has a constant radius spherical surface. Due to the constant curvature of the spherical surface, such a cylinder lens cannot concentrate the light sheet output from a micro-lensed diode bar stack to produce a gaussian-like deposition profile within a laser gain medium such as Nd:YAG or Nd:YLF. Prior art lenses do not allow the creation of an arbitrary pump light distribution from the multiple light sheet output of micro-lensed diode arrays of any pitch spacing.

Thus, a need remains in the art for an optic which can channel the multiple light sheet output from a diode stack of arbitrary pitch and diode bar number into a desired customized pump light deposition profile within a laser gain medium.

SUMMARY OF THE INVENTION

The need in the art is addressed by the present invention which provides a Fresnel cylinder lens having a plurality of facets which channel multiple light sheet output from a diode stack having arbitrary pitch and diode bar number into a gaussian pump light deposition profile within a laser gain medium.

In a specific embodiment, the lens is formed of fused silica or BK7 glass covered with broad angle anti-reflection coating, and the vertical extent of the facets is matched to the pitch spacing of the diode.

DESCRIPTION OF THE INVENTION

An illustrative embodiment will now be described with reference to the accompanying drawings to disclose the advantageous teachings of the present invention.

Figure 1:
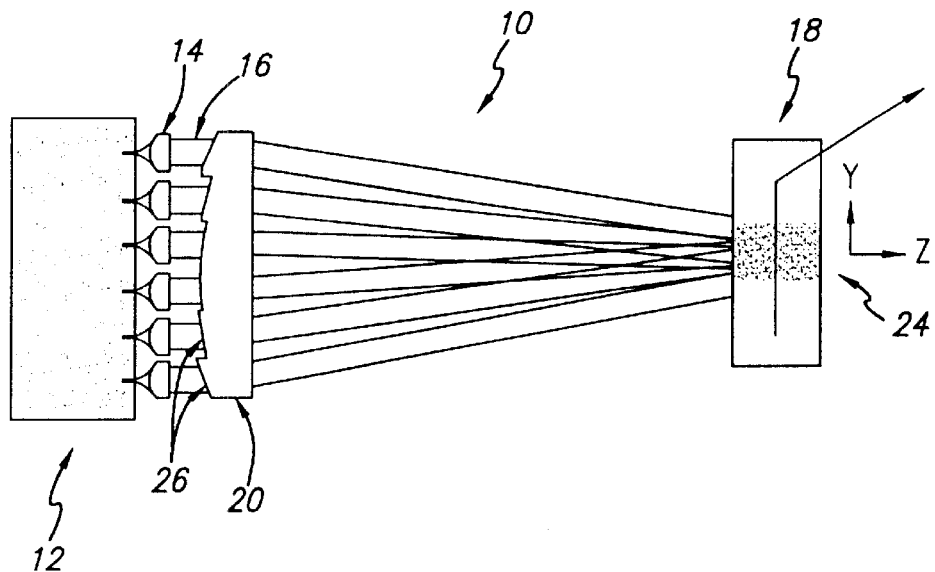
FIG. 1 is a side view of a laser pumping system incorporating a diode light sheet shaping optic in accordance with the present teachings.
Figure 2:
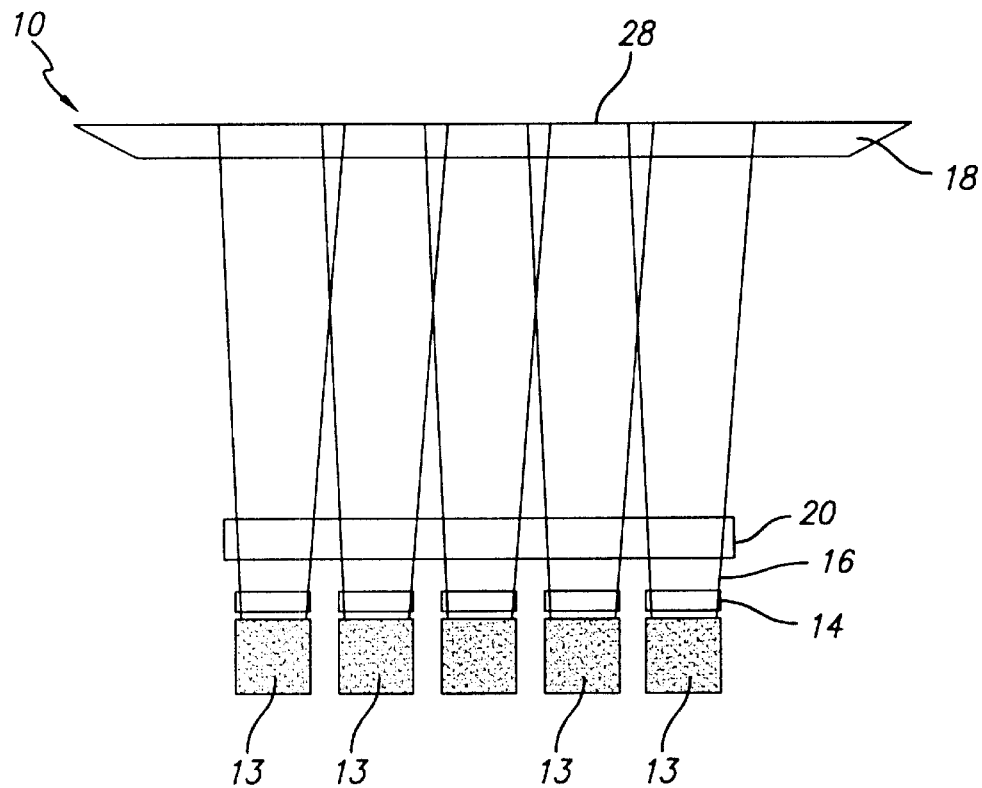
FIG. 2 is a top view of the laser pumping system incorporating a diode light sheet shaping optic in accordance with the present teachings.

FIG. 1 is a side view of a laser pumping system 10 incorporating a diode light sheet shaping optic 20 in accordance with the present teachings. FIG. 2 is a top view of the laser pumping system 10 incorporating the shaping optic 20 in accordance with the present teachings. As shown in FIGS. 1 and 2, the system 10 includes a diode stack 12. The stack 12 includes a plurality of diodes 13. Light from the diodes 13 is collimated by microlenses 14. In the illustrative embodiment, the diode stack 12 and collimating microlenses 14 are of the type manufactured by Infineon Technologies by way of example. The microlenses 14 output collimated light sheets 16.

In accordance with the present teachings, the optic 20 condenses the multiple light sheets 16 output from the micro-lensed, diode bar stack or array 14 and deposits the light in a customized controlled fashion into an area 24 on a side or end-pumped laser gain medium 18 of Neodymium-yag (Nd:YAG) or Neodymium-Yttrium-Lithium-Flouride (Nd:YLF) or other suitable material. In a preferred embodiment, the optic 20 is an anti-reflection coated Fresnel cylinder lens with facet angles designed to produce a gaussian-shaped absorbed pump light distribution that will preferentially support $TEM_{00}$ laser output due to the deposition profile.

Figure 3:
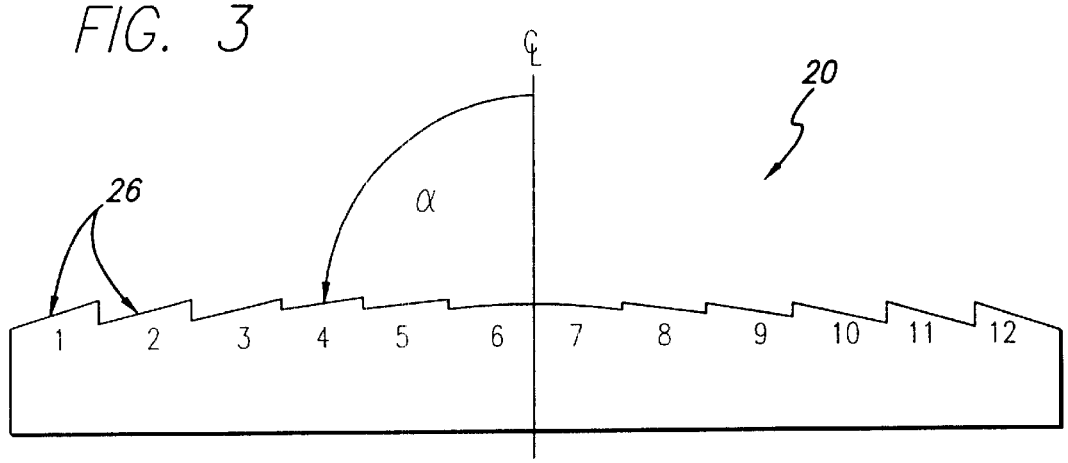
FIG. 3 is an isolated side view of the shaping optic of the present invention.

FIG. 3 is an isolated side view showing an exemplary implementation of the shaping optic 20 of the present invention. For illustration, the optic 20 has twelve facets 26 for use in side pumping a Nd:YAG slab of 4.5 mm thickness and 0.8% Nd concentration. In the illustrative embodiment, the separation of the collimated light sheets (diode pitch) is 1.6 mm, and the collimated light sheet thickness (full width at half maximum intensity) is 0.7 mm. The distance from the lens to the Nd:YAG slab is 3.0 cm, and the target full width at half maximum of the gaussian pump light distribution within the slab is 3.6 mm. The diode stack is positioned next to the optic 20. For these parameters, listed below are the facet angles that produce an illustrative target pump distribution.

| Facet No. | Angle α |
|---|---|
| 1 | 117.178 |
| 2 | 113.225 |
| 3 | 108.432 |
| 4 | 103.357 |
| 5 | 97.926 |
| 6 | 92.683 |
| 7 | 92.683 |
| 8 | 97.926 |
| 9 | 103.357 |
| 10 | 108.432 |
| 11 | 113.255 |
| 12 | 117.178 |

In accordance with the present teachings, these angles were obtained by first specifying the slab deposition profile and then calculating the facet angles in the manner described more fully below to produce the desired profile.

Figure 4:
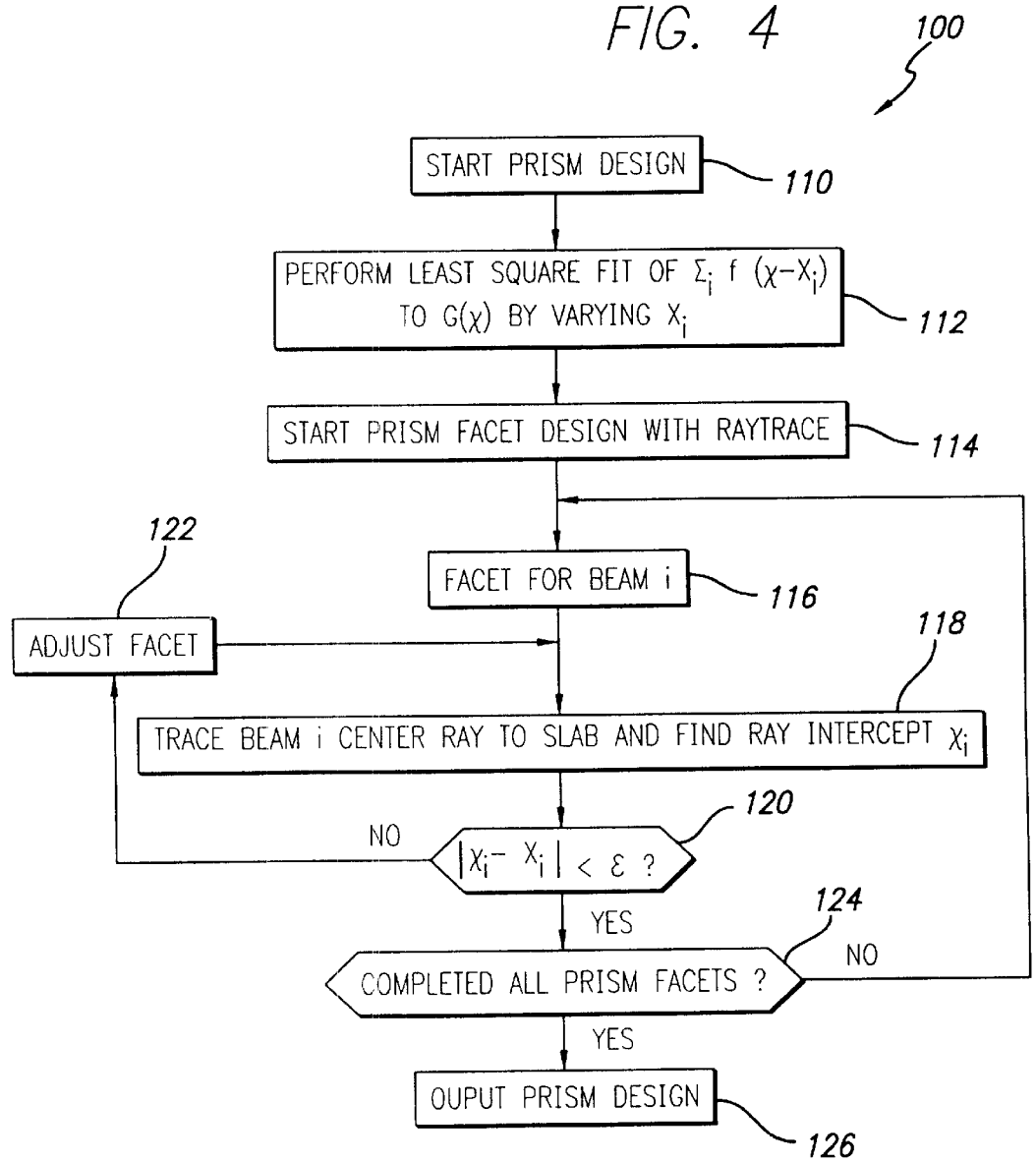
FIG. 4 is a flowchart of the shaping optic design method of the present invention.

FIG. 4 is a flowchart 100 of the shaping optic design method of the present invention. In FIG. 4, the following notations are used:

f(x): laser diode source power density profile,

G(x): desired slab power input profile, x: location of the center of diode source beam i footprint on slab input surface, $X_i$: desired beam i footprint center, and ϵ: ray aiming convergence criterion.

In accordance with the inventive method, as depicted in FIG. 4, first, at step 112, a least squares fit is performed. Next, at step 114, conventional raytrace software is used to begin the shaping optic (prism) facet design. At step 116, an initial facet for beam i is chosen and used in step 118 to trace the center ray of beam i to the slab and find the ray intercept. At step 120, a check is made for satisfaction of the ray aiming convergence criterion. If it is not satisfied, the facet angle is adjusted at step 122 and the algorithm repeats from step 118. If the criterion is satisfied, step 124 checks for completion of all prism facets. If the design is incomplete, the process repeats from step 116. When all facts are complete, the prism (optic) design is output at step 126.

The facets of the shaping optic 20 can be flat, or can have curved surfaces in order to focus the individual light sheets from the diode stack. The diode light sheet thickness, angle of the facets, gain medium absorption at the diode output wavelength, and the Fresnel optic-gain medium distance are parameters which determine the diode pump light distribution within the gain medium.

The shaping optic 20 allows the construction of a gaussian (or other) pump light deposition profile of arbitrary size within the laser gain medium that can be matched to a $TEM_{00}$ resonator mode size. In addition, the throughput of the cylinder lens can be made very high (>98%) by applying a broad angle, anti-reflection coating to both surfaces of the optic. This approach of concentrating diode pump light into a gain medium is also independent of diode bar vertical ("pitch") spacing since the Fresnel facet vertical extent can be made arbitrarily large or small to match the diode pitch spacing.

Those skilled in the art will appreciate that the inventive use of a Fresnel cylinder lens as a diode stack-to-gain medium coupling optic allows the diode pitch spacing to be as large as necessary in order to accommodate diode bar cooling requirements for high duty factor operation. In more conventional schemes where the diode stack is close coupled to the gain medium, the diode pitch determines the y-direction height of the pumped region. High duty factor operation is often not possible with standard stable resonator designs due to the fact that the y-direction height of the diode array required for diode bar cooling is incompatible with the relatively small mode sizes associated with stable resonators. For applications where very high pump densities and high duty factors are required (e.g. quasi-four level laser systems such as Tm:YAG), the Fresnel cylinder lens would be an appropriate choice for a side pumped approach.

Figure 5:
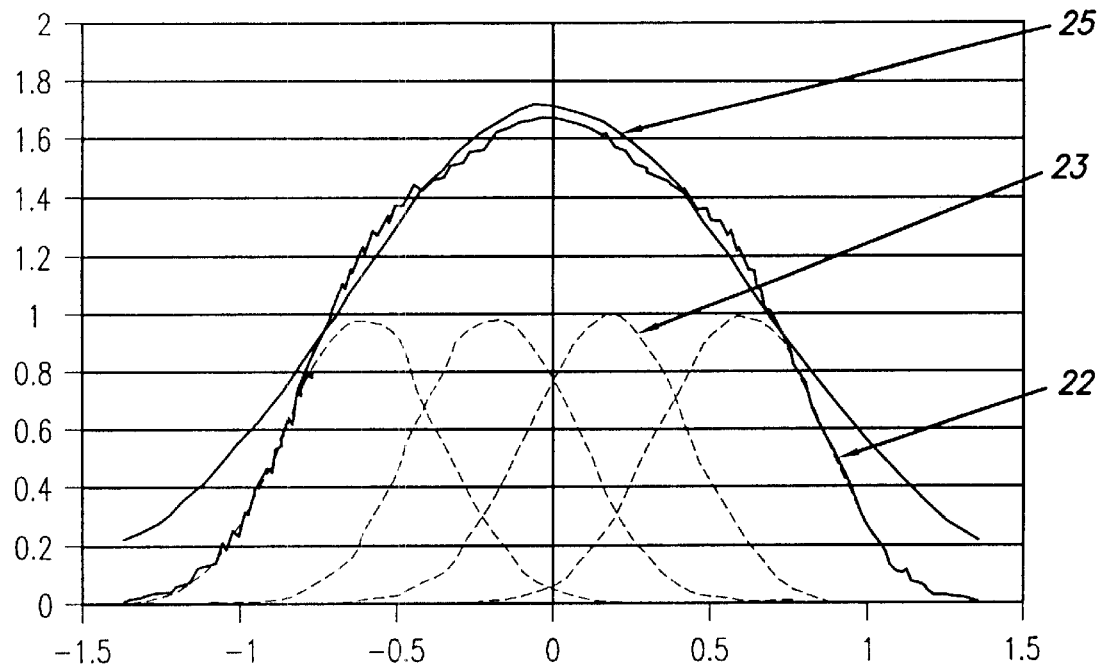
FIG. 5 is a set of graphs showing, a desired pump distribution, diode array power and a diode pump light distribution produced by the shaping optic of the present invention.

In the illustrative embodiment, the shaping optic 20 produces a diode pump light distribution such as that shown at 22 in FIG. 5.

FIG. 5 is a set of graphs showing, a desired pump distribution, diode array power and a diode pump light distribution produced by the shaping optic of the present invention. In FIG. 5, the diode pump light distribution produced by the shaping optic of the present invention is shown at 22, the diode array power is shown at 23 and the desired power profile is shown at 25. Those skilled in the art will appreciate that a traditional cylinder lens with a spherical surface can not easily concentrate the light sheets to produce a gaussian-like deposition profile due to the constant curvature of the spherical surface. In order to produce a gaussian type profile, the present invention provides a dedicated facet and continuously variable facet angle for each light sheet. This flexibility allows the construction of optimal pump deposition profiles that naturally support $TEM_{00}$ laser output.

Although a line pump distribution is depicted in FIGS. 1 and 5, a spot distribution could be created as well. Additionally, the optic 20 could have a curved surface if desired.

Figure 6:
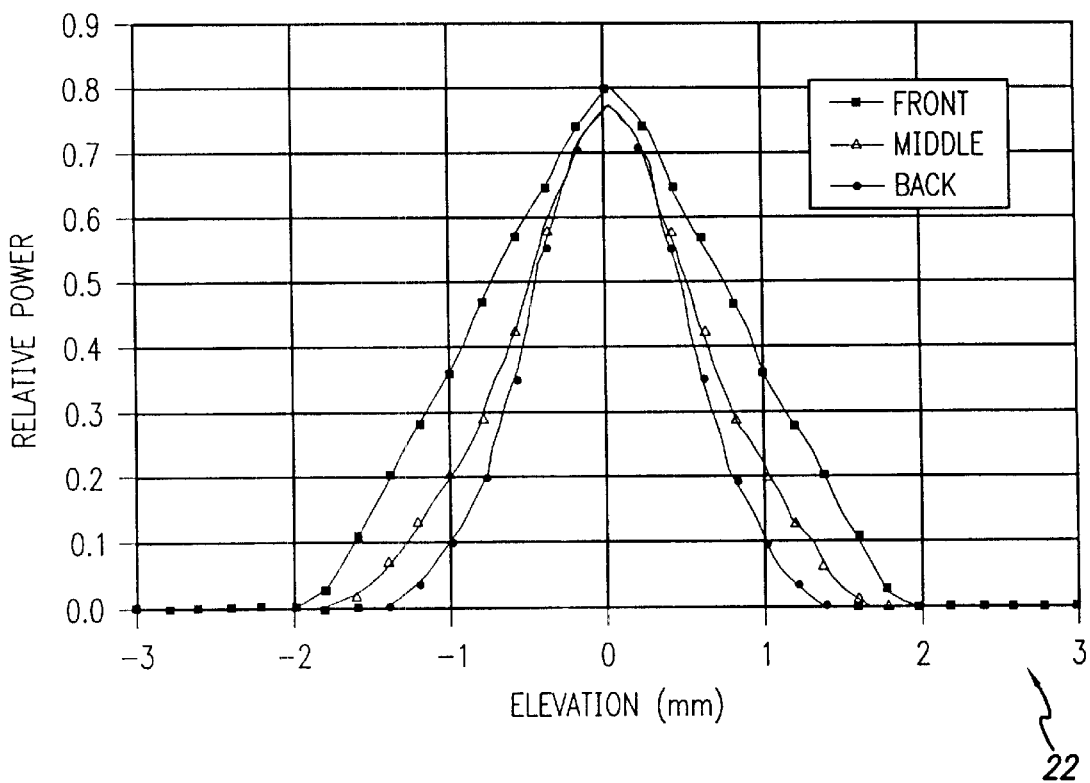
FIGS. 6 and 7 are graphs of pump light distribution profiles of an illustrative implementation of the optic of the present invention.
Figure 7:
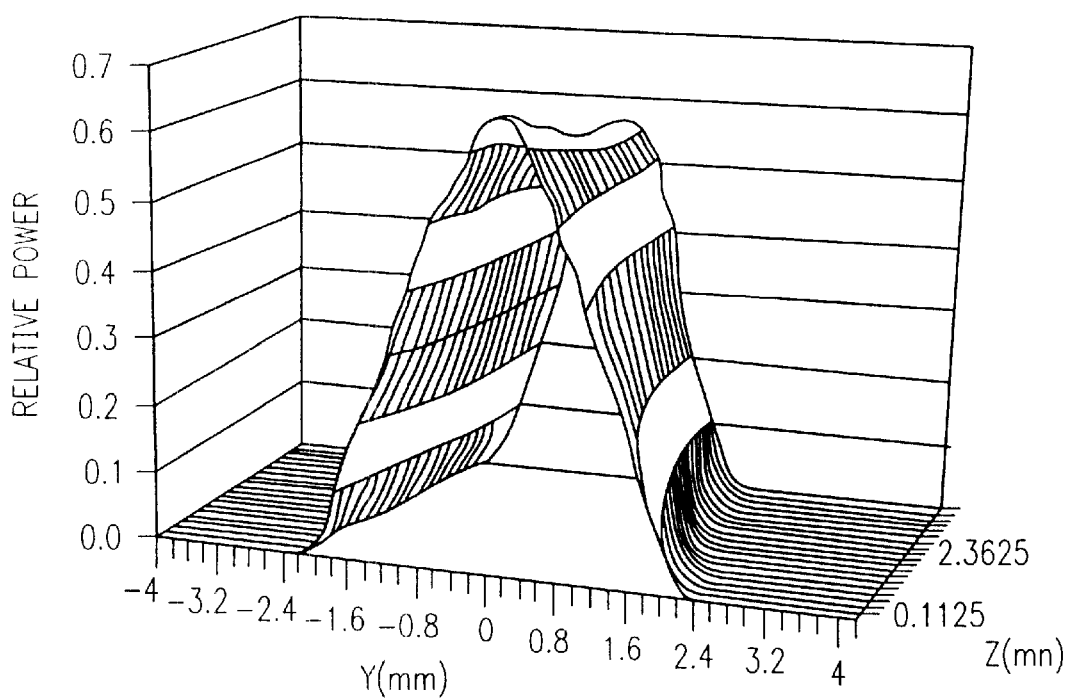

FIGS. 6 and 7 show illustrative pump light deposition profiles 22 at a slab-to-Fresnel lens distance of 3.0 cm for the lens prescription given above. Changing the Fresnel lens Nd:YAG slab distance affects the deposition profile width. This movement can be used to optimize the deposition profile to the resonator lasing mode for preferential $TEM_{00}$ operation.

In the best mode, the angles of the facets 26 of the optic 20 are modeled analytically to take into account the double pass of the pump light due to a high reflective coating on the far surface of the laser gain medium 18. The gain medium 18 can be moved closer to or farther from the optic 20 in order to broaden or narrow the deposition profile 22.

The present invention provides the following significant advantages over prior approaches:

1) it allows the creation of an arbitrary pump light distribution from the multiple light sheet output of micro-lensed diode arrays of any pitch spacing;

2) by applying a broad angle, anti-reflection coating on both surfaces of the optic, it can have very high throughput (>98%) and hence deliver diode light efficiently into the gain medium;

3) the vertical extent of the facets of the shaping optic can be matched to any diode pitch spacing, thus allowing high duty factor, high average power diode arrays to pump small gain volumes with controlled deposition profiles (especially important for quasi four-level laser systems like Tm:YAG); and 4) the optic 20 can be manufactured in a straightforward manner using typical lens material such as fused silica or BK7 glass.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility. For example, those skilled in the art will appreciate that the facet angles can be varied to produce a wide variety of pump light distribution shapes within a medium. Additional embodiments of the present invention could include, for example, placing a second Fresnel lens in the beam path. This would allow the creation of any desired deposition profile. The lenses could be placed back to back, with or without space between them, and might be off-axis. The lenses could also be used to feed multiple gain media, independently or alternately.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A shaping optic comprising:

a Fresnel lens and a plurality of facets disposed on said lens. said facets being disposed to channel light from a diode light sheet into a predetermined profile. the vertical extent of each facet being matched to a pitch spacing of an associated diode in said sheet of diodes.

2. The invention of claim 1 wherein said profile is gaussian.

3. The invention of claim 1 wherein said lens is covered with broad angle anti-reflection coating.

4. The invention of claim 1 wherein said lens is formed of fused silica.

5. The invention of claim 1 wherein said lens is formed of BK7 glass.

* * * * *